Patented Oct. 18, 1949

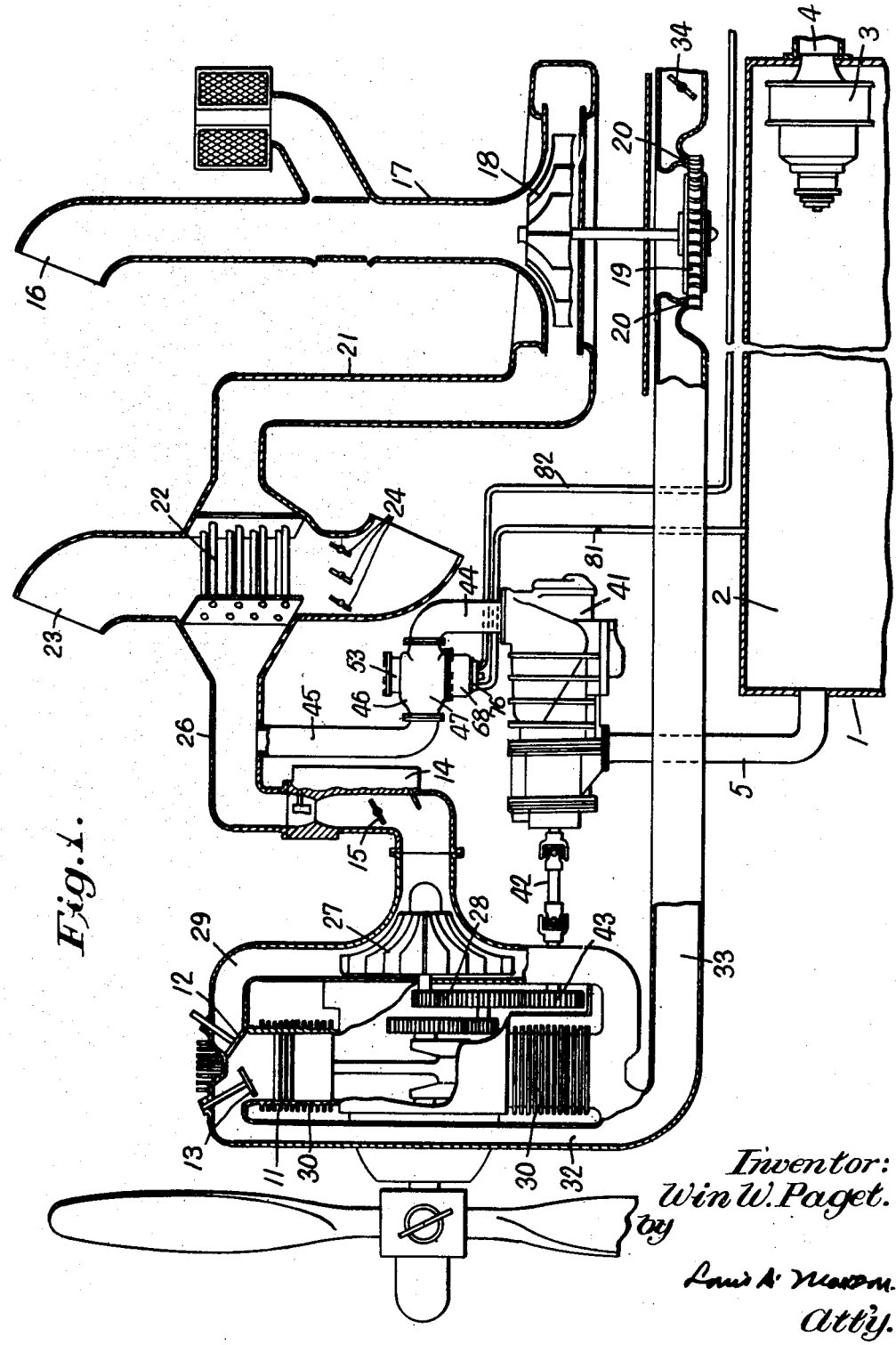

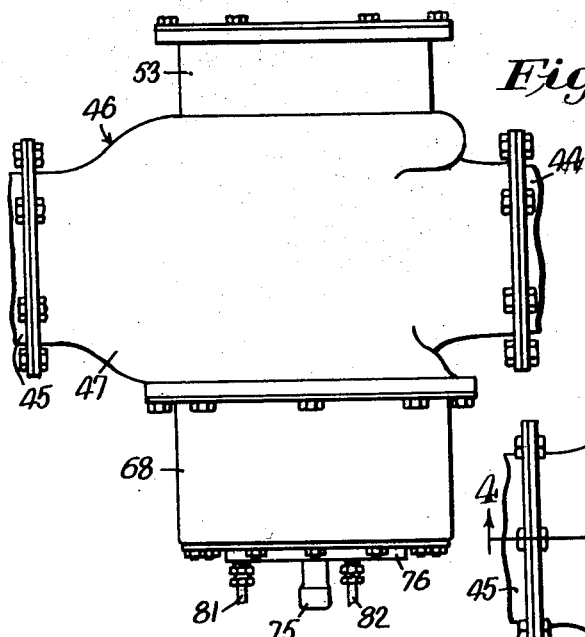
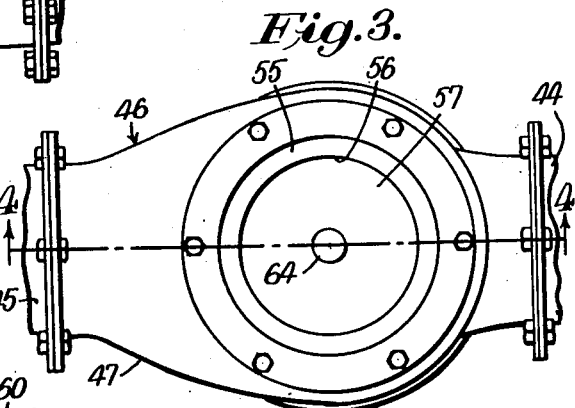
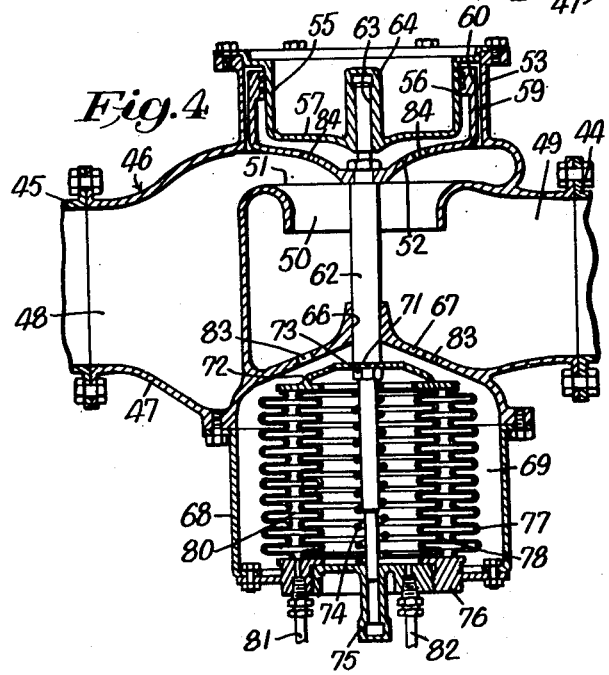
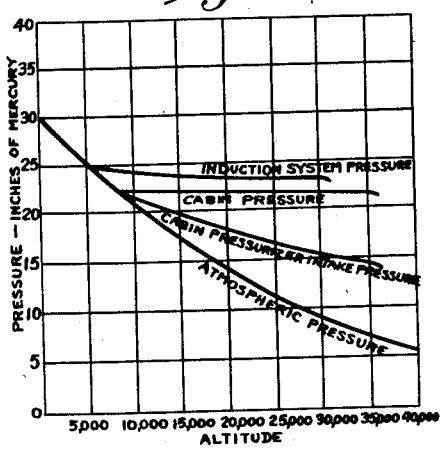

2,484,851

UNITED STATES PATENT OFFICE 2,484,851

PRESSURE CONTROLLING APPARATUS

Win W. Paget, Michigan City, Ind., assignor to Joy Manufacturing Company, a corporation of Pennsylvania Application November 2, 1944, Serial No. 561,602

9 Claims. (Cl. 98—1.5)

My invention relates to cabin pressurizing systems, and, from another aspect, to mechanisms useful in the effecting of cabin pressurizing and in the control of cabin pressures. It will be understood that by the term "cabin" I intend to specify compartments intended for human occupancy whether formed by the shell of the fuselage or by interior compartment walls or by both.

In the pressurizing of aircraft cabins or compartments where turbo or other supercharged engines are used for the propulsion of the aircraft, a convenient source of pressurizing air is furnished by the induction system of the engine or engines. A desirable system for the utilization of this source alone forms the subject matter of another application I am causing to be filed concurrently with this present one. The pressures maintained in the low pressure induction system bear, over a relatively wide range of flight, a desirable relation to cabin pressure, but above certain altitudes the induction system pressure falls rapidly and, for example, during long glides the induction system pressure may fall to very low values, with the result that, instead of air flowing to the pressurized compartment, reverse flow would take place unless provision to prevent it be made; and there would be an interruption of the supply of air to the compartment, even though the more undesirable occurrence of venting of the compartment may be avoided. It is accordingly desirable, especially under conditions where very high altitude flight is contemplated, when utilizing the engine induction system as a source of cabin-pressurizing air, to provide a secondary cabin pressurizing device of appropriate type and design, and by reason of the intake of air from the induction system the built-in ratio of compression of the cabin pressurizer, if a pressurizer of that type be used, can be reduced substantially below that which is necessary where the intake is from ambient pressure. It is desirable moreover, when such a cabin pressurizer is employed, both that it be duly protected from sudden changes of intake conditions to the maximum possible extent, and that its power requirements be minimized. Accordingly, from one aspect, my invention may be considered to be designed to take maximum advantage of the inlet boost which is provided by taking air into the cabin pressurizer from the engine induction system, consistent with the avoidance of severe changes in pressurizer inlet conditions. The importance of this may be appreciated when the small clearances and light weights imposed on the cabin pressurizers by aircraft use are had in mind.

According to current opinion, the most satisfactory system of cabin or compartment pressurizing involves the permitting of compartment pressure to fall freely with ambient pressure until the aircraft in its ascent attains to some such height as 8000 feet. Thereafter it is thought desirable, as long as is reasonably practicable, to maintain the compartment pressure relatively constant, notwithstanding the reduction in the pressure outside of the compartment, as the aircraft continues to ascend. After a certain height, say 30,000 to 35,000 feet, is reached, the differential between compartment and ambient pressure becomes so great that it is desirable to limit its further increase, and thereafter the cabin pressure may be allowed to fall off in such a manner as to maintain a constant differential between it and ambient pressure as the aircraft continues to rise, or a constant ratio of cabin pressure to ambient pressure may be maintained, or first one and then the second of these procedures may be followed. In my application, Serial No. 452,925, filed July 30, 1942, I have disclosed cabin pressure controlling valves respectively regulating the escape of air from the cabin or compartment according to each of the first named systems; and in my application Serial No. 468,938, filed December 14, 1942, I have disclosed a mechanism suited for the obtaining of the sequential control described. Such a device, or one having equivalent functions, will be employed in conjunction with an improved pressurizing-air-supplying system such as I have indicated above is desirable.

In a preferred construction there will be provided, then, in combination with the low pressure induction portion of an engine supercharging system, a cabin pressurizer which may be of the displacement or of the built-in compression type, but which may advantageously be of the built-in compression type, and the intake of the pressurizer may be connected with the low pressure induction system through a valve mechanism arranged to exercise a pressure reducing function on the intake area, and to perform its pressure reducing function in such manner that the intake pressure is gradually reduced as the plane rises but not so rapidly as ambient pressure falls. Desirably, this pressure reducing valve mechanism may maintain the intake pressure of the pressurizing device approximately midway between cabin pressure and atmospheric pressure throughout the normal range of flight after cabin pressurizing commences. And desirably this may be accomplished by providing a control for the intake controlling valve which is a function of three pressures—induction system pressure, cabin or compartment pressure, and ambient pressure; and by appropriate proportioning of the areas subjected to these pressures, and by opposing cabin pressure and ambient pressure cumulatively to the pressure in the induction system there may be obtained the desired control.

It is an object of my invention to provide an improved cabin or compartment pressurizing system. It is another object of my invention to provide an improved valve mechanism having special utility in the field of cabin pressurizing. It is a further object of my invention to provide an improved cabin pressurizing system combining the use of an engine induction system and a cabin pressurizer to provide the necessary delivery of air to the cabin or compartment. It is still another object of my invention to provide an improved valve mechanism normally operating as a pressure reducing valve and having improved controlling means rendering it responsive cumulatively to cabin and ambient pressures. It is still another object of my invention to provide an improved compartment-pressurizing system utilizing a primary source of air normally at a pressure relatively close to and perhaps above the desired cabin pressure but subject to great fluctuation, and including a second pressurizing device taking air from such source, and further including means for reducing the pressure at the intake to said second pressurizing device at a rate proportional to but less than the rate at which ambient pressure falls off. It is still another object of my invention to provide an improved cabin pressurizing system taking advantage of the inlet pressure boost that drawing air from an engine induction system provides, but doing so in a manner consistent with the avoidance of sudden changes in supercharger inlet conditions. It is a still further object of my invention to provide an improved system of stage compression of cabin pressurizing air utilizing a turbo compressor in the engine induction system as a primary stage compressor and a second compressor of relatively low built-in-compression-ratio for the second stage of compression. It is still another object of my invention to provide an improved control valve mechanism for use in a cabin pressurizing system. It is yet a further object to provide an improved pressure reducing valve especially designed for cabin pressurizing use and having its operations cumulatively controlled by supply, cabin and ambient pressures.

Other objects and advantages of the invention will hereinafter more fully appear.

In the accompanying drawings, in which one illustrative embodiment of my invention is shown for purposes of illustration, Fig. 1 is a view, partially in section and partially in elevation, showing a system in which my invention is incorporated in a plurality of its aspects in illustrative form.

Fig. 2 is a side elevational view of a controlling valve mechanism for regulating the intake pressure of a cabin pressurizing device.

Fig. 3 is a top plan view of the valve mechanism shown in Fig. 2.

Fig. 4 is a vertical section on the plane of the line 4—4 of Fig. 3 through the valve mechanism.

Fig. 5 is a diagram showing certain pressure relations.

Referring now to the drawings, and particularly at first to Fig. 1, it will be observed that 1 represents the cabin or compartment of an aircraft whose interior 2 is to be pressurized, herein by supplying the same with an appropriate quantity of air at an appropriate pressure and by controlling the pressure which exists by a cabin pressure regulating valve 3 which governs the escape of air from the cabin through a conduit 4. The cabin pressure regulating valve 3 may be, generally speaking, of any suitable type, for example, such as any of those shown in my copending applications above identified; and the operation of this valve will be understood to be such that through the regulation of the rate of discharge of air from the cabin the cabin pressure may be allowed to fall substantially at the same rate that external pressure falls until the aircraft reaches an elevation of, say, 8000 feet; and thereafter the cabin pressure will be maintained relatively constant at a value substantially equal to the external pressure at the altitude at which pressurizing begins, until the aircraft reaches a much higher elevation, such as 30,000 or 35,000 feet; and above that altitude the pressure will be allowed to fall off in the cabin or compartment in such a manner preferably as first to maintain a constant differential and then a constant ratio with respect to ambient pressure, though either system may be used alone. The air supplied to the interior of the cabin or compartment is taken, according to the illustrative embodiment of the invention, from the induction system of the aircraft engine or engines, at a point therein short of the carburetor, and enters the compartment through a conduit designated 5 which has various devices associated with it.

In Fig. 1 the power plant of a turbo-supercharged engine is illustrated. It will be observed that the radial type engine 11 shown is provided with intake valves 12 and exhaust valves 13 and with a carburetor 14 with which a throttle 15 is associated. A carburetor air scoop 16 is connected through a suitable conduit 17 with a turbo-compressor 18, which is driven by a turbine wheel 19 to which exhaust gases under pressure and at high velocity are adapted to be delivered through nozzles 20, 20. The turbo compressor forces the air taken in through the carburetor air scoop, through a conduit 21, and through an intercooler 22, which is provided with its own air scoop 23 and with a series of intercooler shutters 24 suitably controlled to provide the desired degree of cooling of the air delivered to the conduit 21. From the intercooler 22 the air is delivered through a conduit 26 to the carburetor 14 where it is mixed with fuel to form a combustible mixture, and this combustible mixture is discharged from the carburetor to an internal blower 27 having a suitable gear drive 28. From the blower the combustible mixture passes into a manifold 29 from which it is admitted to the cylinders 30 of the engine past the intake valves 12, and then exploded. The exhaust gases flow from the cylinders past the opened exhaust valves 13 into a collecting system 32, and then pass through a conduit 33 leading to the nozzles 20; and any desirable part of the exhaust gases may be allowed to escape past the nozzles through a waste gate 34 and thence out of the aircraft. It is unnecessary to go in detail into the automatic controls for the system thus briefly described, since they are well known to experts in the aircraft art and are described at length in the periodical literature of the aircraft industry (see for example "Aero Digest" for March 18, 1944, page 110). It will suffice to say, therefore, that the pressure in the induction system, that is, at least in the low pressure portion thereof, to wit, in the conduits 21 and 26, will be atmospheric when the aircraft is on the ground and the turbo-compressor 18 is not in operation. When the engine has been warmed up and the aircraft is ready to take off, the pressure in this portion of the induction system may be as much as 80 inches of mercury absolute. As the aircraft rises, the induction system pressure will be allowed to fall off until, say, at an altitude of around 5,000 feet it will be approximately 25 inches of mercury absolute. From this altitude up, until the induction system pressure can no longer be maintained substantially constant within the safe limits of operation of the turbo-compressor 18, the induction system pressure will be maintained automatically nearly constant, perhaps falling off to 22 inches or so of mercury, absolute, at a height of, say, 30,000 feet. It will be understood that the nature of the automatic controls provided and the settings determined by the pilot will govern the precise conditions which will be effected. However, from the height of 5,000 feet to the height of about 30,000 feet or slightly more, in the illustrative example now under consideration, the induction system pressure will not drop more than a couple of inches of mercury, so that throughout nearly all of the period during which cabin or compartment pressure is to be maintained substantially constant the pressure in the induction system of the engine, from which induction system the air for the cabin is drawn, will remain substantially constant.

It will further be observed in Fig. 1 that air is supplied to the conduit 5 through a pressurizer or supercharger 41 driven through a universal drive 42 from suitable engine-driven reduction gearing 43. This supercharger may assume various forms, but a desirable construction for such a device is shown in my application Serial No. 458,641, filed September 17, 1942, now Patent No. 2,477,003 of July 26, 1949. An automatically changing multi-speed drive may be desirably included in the event that there be substantial variations in engine speed, but with an approximately constant-speed engine control such as is common, this feature may be omitted, if desired. By-passing a portion of the air taken in until a certain altitude is reached may be employed if desired, with the by-passed air returned to any of the lines 21, 26 or 44 later mentioned. The supercharger takes in air through a conduit 44, to which air is delivered from the air induction system of the engine 11 at a point in the conduit 26 short of the carburetor 14, the air passing from the line 26 through a conduit 45 which is connected with the conduit 44 by a valve mechanism 46, shortly to be described. The valve mechanism 46 includes a casing 47 having an inlet chamber 48 and a discharge chamber 49, these chambers respectively connected to the conduits 45 and 44. Communication between the chambers is afforded by an opening 50 surrounded by a valve seat 51 with which a balanced valve 52 is adapted to cooperate. The valve 52 is slidable relative to a compartment formed by a cylindrical wall portion 53 integral with the housing 47 and of limited annular cross sectional area because of the provision of an end closure member 55 which has a cylindrical wall portion 56 concentric with the wall portion 53 and further has an inner transverse wall 57. The valve 52 has a cylindrical portion 59 slidable in the annular space 60 between the walls 53 and 56. The valve 52 is mounted on a stem 62 whose upper end is guided in a bore 63 in a thimble 64 carried by the end wall 57 previously mentioned. The valve stem at a lower point is guided in a bore 66 formed in a bottom wall portion 67 of the discharge chamber 49. A bowl-like chamber-forming element 68 forms a housing for bellows devices controlling the position of the valve 52; and this element 68 cooperates with wall portions of the housing 47 to provide a chamber 69 in which the bellows devices mentioned are arranged. The stem 62 has a shoulder 71 to which an end member 72 is secured by a nut 73, and a spring 74 surrounding the valve stem 62 near the lower end of the latter normally acts in opposition to the weight of the valve 52 and tends to maintain the valve open. The stem 62 at its lower end is guided in another thimble or guide 75. The bottom of the bowl-like element 68 is formed by a removable closure member 76 to which the lower ends of a pair of corrugated bellows 77 and 78 are suitably secured, as by brazing, soldering, or the like. The upper ends of these bellows devices are similarly secured to the plate 72. An annular space 80 between the bellows devices is connected by a conduit 81 to the interior 2 of the cabin or compartment 1, and the space within the bellows 78 is connected by a conduit 82 to external pressure. The wall 67 is provided with openings 83 so that pressure within the space 49 acts on the exterior of the compound bellows mechanism mentioned and tends to collapse the same; and openings 84 are formed through the valve 52 to effect the balancing of the latter. Before analyzing the mode of operation of the valve mechanism 46, it may be observed that one-way valves permitting flow only in the direction from the conduit 26 towards the cabin space 2 may be arranged in either or both of the conduits 45 and 44, but, unless the drive 42 for the supercharger 41 breaks, these check valves are unnecessary.

It may now be noted that, disregarding the weight of the balanced valve and its stem and the forces exerted by the spring 74 and by the bellows proper due to their elasticity, the forces tending to effect closing and opening of the valve 52 are as follows:

The pressure in the chamber 49, which is cabin-pressurizer intake pressure and tends to collapse the bellows and close the valve 52, acts on an effective area equal to the area of the circle whose diameter is the effective diameter of the bellows 77 (ignoring the relatively unimportant item of the cross section of the stem 62).

The forces tending to open the valve 52 are provided by external (ambient) pressure acting on an area equal to the area of the circle whose diameter is the effective diameter of the bellows 78, and by cabin or compartment pressure acting on the annulus whose effective area is the difference between the area of the circle whose diameter is the effective diameter of the bellows 77 and the area of the circle whose diameter is the effective diameter of the bellows 78 (ignoring again, because of its unimportance, the matter of the area of the cross section of the valve stem 62, which might obviously be made of uniform diameter throughout its length, if desired).

Now ignoring again the relatively negligible effects of the valve stem, it will be observed that cabin supercharger inlet pressure will be approximately equal, with the valve mechanism disclosed, to $$\frac{(A^2-B^2)\times\text{cabin pressure}+B^2\times\text{altitude ambient pressure}}{A^2}$$

where A is the effective diameter of the bellows 77 and B is the effective diameter of the bellows 78. It will be obvious that $$\frac{\pi}{4}$$

has been dropped out of both the numerator and denominator of the formula.

From this it will be evident that as ambient pressure falls cabin supercharger inlet pressure will also be reduced; and desirably the area B will be so predetermined that cabin supercharger pressure will be maintained substantially midway between cabin pressure and ambient pressure at various altitudes within the range of normal pressurizing of the cabin. The results of such a construction of the valve mechanism 46 may be simply noted with the aid of Fig. 5, which does not purport to show the entire range of pressures either at the upper or lower limits. The atmospheric pressure line is shown from ground level to 40,000 feet. The induction system pressure, which may range as high as 80 inches of mercury absolute when the aircraft is ready to take off, is not shown for altitudes below 5,000 feet, as it is not necessary. Cabin pressure, with a cabin pressure controlling valve like the mechanism 3, follows the atmospheric pressure line to the 8,000 foot point, and then is maintained nearly constant from its value at 8,000 feet, 22.22 inches, until a height of perhaps 35,000 feet is reached. By reason of the construction of the bellows devices controlling the position of the valve 52, cabin pressurizer intake pressure is caused to fall from 22.22 inches of mercury absolute at 8,000 feet to a value at 30,000 feet of perhaps 15.5 inches of mercury absolute, instead of being at the value of 8.87 inches of mercury absolute, which would prevail were air taken into the pressurizer 41 at ambient pressure.

In view of what has been said, further detailed description of the mode of operation of the invention will be unnecessary. Obviously, the structure described permits the taking of maximum advantage of the inlet boost at the intake of the supercharger 41, consistent with avoidance of sudden serious changes in supercharger inlet conditions. It is very important, as indicated above, that the finely constructed, light-weight supercharging devices be protected from violent sudden changes in inlet pressure, with resultant violent sudden changes in ratio of compression, in temperatures, etc. When the throttle of the engine is closed there will be a sharp drop in the pressure existing in the low pressure induction system, but even if there is a drop in pressure in the induction system all the way to ambient pressure, it will be evident that the reduction in cabin pressurizer intake pressure will be substantially halved. It will be clear, therefore, that my invention effects a very desirable protection of the supercharger, and it also makes it possible to reduce the ratio of compression through which the supercharger has to work, cutting the ratio of compression from perhaps in excess of 3 to 1 to 2 to 1, or substantially less, perhaps even to as little as 1.5 to 1, with a resultant improvement in the working conditions to which the supercharger may be subjected and a reduction in leakage losses, etc. and indeed in size. While it may appear that the fact that the valve mechanism 46 acts as a pressure reducing valve would tend to involve a greater requirement for power, it will be appreciated on further thought that a power saving will actually be effected because the cabin pressurizer will not be compressing from ambient pressure at all times as would otherwise be the case. It will also be observed that at below 8,000 feet the maximum pressure that can be put on a supercharger intake will be ambient flight pressure, for that will be the maximum pressure which can subsist inside the bellows 78 and between the bellows 77 and 78, so that the valve 52 will effect a reduction of the intake pressure to ambient pressure. It will be evident to those realizing the possible duration of sustained glides that the provision of the supercharger 41, with the control for its intake which has been disclosed, is distinctly desirable, as it assures adequate air supply even during such times, for though the pressure at the intake of the supercharger may then be reduced to ambient pressure the supercharger will still continue to pump air in adequate quantity to the cabin. Where air is taken without intermediate compression from the low pressure induction system, pressure supply to the cabin will be interrupted during long glides because the induction system pressure then falls below cabin pressure. It will also be appreciated that the degree of throttling by the valve mechanism 46 increases with altitude, and that this is desirable for the reasons heretofore explained. The valve mechanism 46 does not attempt to hold the flow rate to the cabin constant, but is used to protect the cabin supercharger from violent changes in pressure in the engine induction system, and this it most effectually will do. It will thus be clear that my invention results in distinct improvements over a cabin pressurizing system in which the pressurizing air is drawn from the low pressure induction system of the aircraft propelling engine, and delivered to the cabin, when possible, by the pressure differential existing between the induction system and the interior of the cabin, and no provision is made for the delivery of air to the cabin during periods when the available induction system pressure is below cabin pressure.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a cabin pressurizing system for aircraft, in combination, a source of air under pressure, a cabin to be pressurized, a pressurizer taking air from said source and having its discharge connected with said cabin, valve means controlling the communication of the intake of said pressurizer with said source, and controlling means for said valve means including a pressure responsive device having means for subjecting the same to ambient pressure in a direction such that increases in ambient pressure increase the valve opening force.

2. In a cabin pressurizing system for aircraft, in combination, a source of air under pressure, a cabin to be pressurized, a pressurizer taking air from said source and having its discharge connected with said cabin, a valve means controlling the communication of the intake of said pressurizer with said source, and controlling means for said valve means including a pressure responsive device having means for subjecting the same to ambient pressure and another pressure responsive device having means for subjecting it to cabin pressure.

3. In a cabin pressurizing system for aircraft, in combination, a source of air under pressure, a cabin to be pressurized, a pressurizer taking air from said source and having its discharge connected with said cabin, valve means controlling the communication of the intake of said pressurizer with said source, and controlling means for said valve means including a pressure responsive device having means for subjecting the same to ambient pressure in a direction such that increases in ambient pressure increase the valve opening force and another pressure responsive device having means for subjecting it to cabin pressure in a direction such that increases in cabin pressure increase the valve opening force.

4. In a cabin pressurizing system for aircraft, in combination, a source of air under pressure, a cabin to be pressurized, a pressurizer taking air from said source and having its discharge connected with said cabin, valve means controlling the communication of the intake of said pressurizer with said source, and controlling means for said valve means including a pressure responsive device having means for subjecting the same to ambient pressure in a direction such that increases in ambient pressure increase the valve opening force, and means for opposing to the action of said pressure responsive device a force which is a function of the intake pressure of said pressurizer.

5. In a cabin pressurizing system for aircraft, in combination, a source of air under pressure, a cabin to be pressurized, a pressurizer taking air from said source and having its discharge connected with said cabin, valve means controlling the communication of the intake of said pressurizer with said source, and controlling means for said valve means including a pressure responsive device having means for subjecting the same to ambient pressure in a direction such that increases in ambient pressure increase the valve opening force and another pressure responsive device having means for subjecting it to cabin pressure in a direction such that increases in cabin pressure increase the valve opening force, and means for opposing to the action of said pressure responsive devices a force which is a function of the intake pressure of said pressurizer.

6. In combination, a compartment to be pressurized, means associated with said compartment to control the pressure therein while permitting the controlled escape of air therefrom, a source of air under pressure for pressurizing said compartment, said source being subject to fluctuations in pressure between values exceeding compartment pressure and less frequent values below compartment pressure, a pressurizing device discharging to said compartment, and means for connecting the intake of said pressurizing device to said source of air under pressure having a controlling valve mechanism associated therewith for controlling such connection, said controlling valve mechanism including controlling means subjected to cumulative action of compartment and ambient pressures.

7. In combination, in an aircraft compartment pressure controlling apparatus, a valve casing having a seat and containing a balanced valve, and having chambers at opposite sides of said seat adapted to be connected one at an aircraft compartment to be pressurized and the other to a point between which and said compartment flow is adapted to take place under the control of said valve, and operating means for said valve for regulating its position relative to its seat including expansible chamber devices subjected respectively to compartment and to ambient pressures, said devices being so arranged that upon expansion thereof by the ones of said pressures to which they are respectively subjected they exert thrust upon said valve in the same direction.

8. In combination, in an aircraft compartment pressure controlling apparatus, a valve casing having a seat and containing a balanced valve, and having chambers at opposite sides of said seat adapted to be connected one to an aircraft compartment to be pressurized and the other to a point between which and said compartment flow is adapted to take place under the control of said valve, and operating means for said valve for regulating its position relative to its seat including coaxial bellows devices subjected respectively to compartment and to ambient pressures, said devices being so arranged that upon expansion thereof by the ones of said pressures to which they are respectively subjected they exert thrust upon said valve in the same direction.

9. In combination, in an aircraft compartment pressure controlling apparatus, a valve casing having a seat and containing a balanced valve, and having chambers at opposite sides of said seat adapted to be connected one to an aircraft compartment to be pressurized and the other to a point between which and said compartment flow is adapted to take place under the control of said valve, and operating means for said valve for regulating its position relative to its seat including concentric bellows devices subjected respectively to compartment and to ambient pressures, said devices being so arranged that upon expansion thereof by the ones of said pressures to which they are respectively subjected they exert thrust upon said valve in the same direction.

WIN W. PAGET.

REFERENCES CITED

The following references are of record in the file of this patent:

UNITED STATES PATENTS

| Number | Name | Date |
| --- | --- | --- |
| Re. 22,272 | Price | Feb. 16, 1943 |
| 2,350,896 | Jde | June 6, 1944 |
| 2,353,201 | Talbot | July 11, 1944 |
| 2,358,835 | Streid | Sept. 26, 1944 |

OTHER REFERENCES

Hand Book of Instruction and Maintenance, Boeing Stratoliner, Model S-307 (pages 44-52).

Erection and Maintenance Instructions, Army Model B-29 Airplane (pages 290, 291 and 513-527).

Army Model B-29 Airplane.

Certificate of Correction

Patent No. 2,484,851                                                               October 18, 1949

WIN W. PAGET

It is hereby certified that error appears in the printed specification of the above numbered patent requiring correction as follows:

Column 8, line 60, before the word "valve" strike out "a"; column 9, line 62, for "one at" read *one to*;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*